2,846,399

BACTERICIDAL N-(2-3 DICHLORALLYL-3-(HALOPHENYL) UREAS

David J. Beaver, Richmond Heights, and Paul J. Stoffel, St. Louis, Mo., assignors to Monsanto Chemical Company, St. Louis, Mo., a corporation of Delaware No Drawing. Application May 26, 1955
Serial No. 511,412

7 Claims. (Cl. 252—107)

This invention relates to new and useful urea derivatives and to processes for making same.

The compounds of this invention may be represented by the structural formula

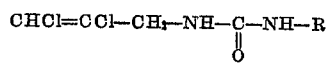

where R is a phenyl radical being unsubstituted in at least one ortho position and containing 1 to 4 chlorine atoms, as for example 3-chlorophenyl, 4-chlorophenyl, 3,4-dichlorophenyl, 3,5-dichlorophenyl, 3,4,5-trichlorophenyl, 2,4,5-trichlorophenyl and 2,3,4,5-tetrachlorophenyl.

These new compounds are useful as bacteriostats and may be prepared by reacting 2,3-dichlorallyl amine with an isocyanate of the formula $$R-N=C=O$$

where R is a chlorinated phenyl radical having at least one free ortho position in the presence of an inert organic solvent such as toluene, benzene, chlorobenzene, kerosene, hexane, heptane, and the like. The temperature of the reaction may vary widely from room temperature to the reflux temperature of the system depending upon the particular reactants and the desired product.

As illustrative of the preparation of the new compounds is the following:

EXAMPLE

To a suitable reaction vessel is added and intimately mixed approximately 34 parts by weight of 2,3-dichlorallyl amine and approximately 51 parts by weight of 3,4-dichlorophenyl isocyanate in approximately 160 parts by weight of diethyl ether. The mixture is agitated for about one hour. The mass is filtered and the filter cake (a dried sample of which melted at 128–134° C.) is taken up with hot petroleum ether, cooled and filtered. There is obtained 1-(2,3-dichlorallyl)-3-(3,4-dichlorophenyl)-urea as fine white needles melting at 105.1–105.9° C.

Replacing 3,4-dichlorophenyl isocyanate with a chemically equivalent amount of the following chlorophenyl isocyanates, the following 1-(2,3-dichlorallyl)-3-(chloro substituted phenyl) ureas are obtained:

| Chlorophenyl isocyanate | Urea Derivative  |
|---|---|
| 3-chlorophenyl isocyanate | ![](Cl at 3-position) |
| 4-chlorophenyl isocyanate | ![](Cl at 4-position) |
| 3-5-dichlorophenyl isocyanate | |
| 3,4,5-trichlorophenyl isocyanate. | |
| 2,4,5-trichlorophenyl isocyanate. | |

Of these new urea derivatives 1-(2,3-dichlorallyl)-3-(3,4-dichlorophenyl) urea has been found to be an outstanding soap bacteriostat. As illustrative of such this compound was incorporated in an "Ivory" brand neutral high grade white tallow soap in a weight ratio of one part to 50 parts by weight soap. Aliquots were added to a Sabourard's dextrose agar medium so as to give concentrations of 10 and 1 parts per million of the compound in the agar. The agar in each case was then poured into a petri dish, allowed to harden and then inoculated with a standard culture of Micrococcus pyogenes var. aureus of standard resistance. The incubation in each instance was made simultaneously at 37° C. for 48 hours. The extent of growth is noted below:

Table I

| Concentration, p. p. m. | 10 | 1 |
|---|---|---|
| 1-(2,3-dichlorallyl)-3-(3,4-dichlorophenyl) urea | none | none |

Relatively small amounts of 1-(2,3-dichloroallyl)-3-(3,4-dichlorophenyl) urea in a detergent soap composition has been found to yield effective bacteriostatic detergent soap compositions. Amounts as low as 0.5 to 1% by weight based upon the weight of the detergent soap have proved satisfactory in some instances. However, it is preferred to employ this new bacteriostat in amounts in the order of 1 to 3% by weight based on the detergent. While larger amounts, as for example up to 10% by weight, may be employed, the upper limit will be determined by practical considerations. Various colors, antioxidants, perfumes, water softeners, emollients, and the like may be included where desirable in detergent compositions containing this new bacteriostat. The terms "soap" or "detergent soap" as used herein is employed in its popular or ordinary meaning, i. e. those cleansing compositions prepared from an alkali metal compound such as potassium or sodium hydroxide and a fat or fatty acid, both saturated and unsaturated.

This new bacteriostatic agent may be added to the soap in any suitable manner during the crutching or milling or similar operation. It may be dissolved in a suitable solvent prior to admixing with the soap. If it is desired the new bacteriostatic agent may be added to the soap without dissolving it previously. In the case of "frame" soaps it is preferred to add the bacteriostatic agent to the soap during the crutching operation. With milled soaps, it is preferred to make the addition during the milling operation. In the case of liquid soaps, it is preferred to affect the addition while the agent is in solution. In general, any method which results in the bacteriostatic agent being uniformly incorporated into the soap product is satisfactory.

While this invention has been described with respect to certain embodiments it is not so limited and it is to be understood that variations and modifications thereof obvious to those skilled in the art may be made without departing from the spirit or scope of this invention.

What is claimed is:
1. Urea compounds of the structure

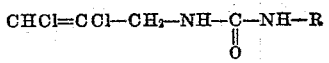

where R is a phenyl radical containing at least one unsubstituted ortho position and containing from 1 to 4 chlorine substituents.
2. 1-(2,3-dichlorallyl-3-(3,4-dichlorophenyl) urea.
3. 1-(2,3-dichlorallyl)-3-(3,4,5-trichlorophenyl) urea.
4. 1-(2,3-dichlorallyl)-3-(2,4,5-trichlorophenyl) urea.
5. The method of making a compound of the structure

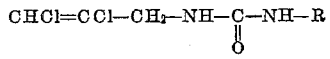

which comprises reacting 2,3-dichlorallyl amine with an isocyanate of the formula

where R is a phenyl radical containing at least one unsubstituted ortho position and containing from 1 to 4 chlorine substituents in the presence of an inert organic solvent.
6. A detergent soap composition essentially comprising a detergent soap and 0.5% to 10% by weight based on the soap of 1-(2,3-dichlorallyl)-3-(3,4-dichlorophenyl) urea.
7. The method of making 1-(2,3-dichlorallyl)-3-(3,4-dichlorophenyl) urea which comprises reacting 2,3-dichlorallyl amine with 3,4-dichlorophenyl isocyanate in the presence of an inert organic solvent.

References Cited in the file of this patent
UNITED STATES PATENTS

| | | |
|---|---|---|
| 2,673,877 | Thompson | Mar. 30, 1954 |
| 2,678,302 | Beaver et al. | May 11, 1954 |
| 2,692,862 | Lipsitz | Oct. 26, 1954 |
| 2,723,192 | Todd | Nov. 8, 1955 |